US010351009B2

(12) United States Patent
Miller et al.

(10) Patent No.: US 10,351,009 B2
(45) Date of Patent: Jul. 16, 2019

(54) ELECTRIC VEHICLE DISPLAY SYSTEMS

(71) Applicant: FORD GLOBAL TECHNOLOGIES, LLC, Dearborn, MI (US)

(72) Inventors: Kenneth James Miller, Canton, MI (US); Douglas Raymond Martin, Canton, MI (US); William Paul Perkins, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 443 days.

(21) Appl. No.: 14/814,713

(22) Filed: Jul. 31, 2015

(65) Prior Publication Data
US 2017/0028866 A1 Feb. 2, 2017

(51) Int. Cl.
*B60W 10/30* (2006.01)
*B60L 11/18* (2006.01)
(Continued)

(52) U.S. Cl.
CPC .......... *B60L 11/1861* (2013.01); *B60K 35/00* (2013.01); *B60L 58/12* (2019.02); *B60W 10/06* (2013.01); *B60W 10/08* (2013.01); *B60W 10/30* (2013.01); *B60W 20/10* (2013.01); *B60W 20/12* (2016.01); *B60W 20/40* (2013.01); *B60W 50/14* (2013.01); *G01C 21/36* (2013.01); *B60K 2350/1092* (2013.01); *B60W 2050/146* (2013.01); *B60W 2510/244* (2013.01);
(Continued)

(58) Field of Classification Search
USPC ............... 701/410, 22.36, 538, 34.1, 123; 715/771–772; 340/901; 180/31, 65; 455/418–420
See application file for complete search history.

(56) References Cited

U.S. PATENT DOCUMENTS 7,564,376 B2 7/2009 Jang
8,058,982 B2 * 11/2011 Crowe ..................... B60K 6/48
340/439
(Continued)

FOREIGN PATENT DOCUMENTS

CN 103057486 A 4/2013
DE 102013210056 A1 12/2014
(Continued)

OTHER PUBLICATIONS

Energy control for Plug-In HEV with ultracapacitors lithium-ion batteries storage system for FIA Alternative Energy Cup Race Ferdinando Luigi Mapelli; Davide Tarsitano; 2010 IEEE Vehicle Power and Propulsion Conf.,Year: 2010; pp. 1-6, DOI: 10.1109/VPPC.2010.5729147.*
(Continued)

*Primary Examiner* — Cuong H Nguyen
(74) *Attorney, Agent, or Firm* — Frank Lollo; Brooks Kushman, P.C.

(57) ABSTRACT

An electric vehicle display system may include a battery, an interface configured to present at least one selectable icon configured to control a battery powered vehicle feature, and a controller programmed to, in response to state-of-charge (SOC) data indicating that a trip range exceeds a possible driving range, update the selectable icon to indicate a suggested adjustment to the vehicle feature to decrease power demand of the feature.

13 Claims, 7 Drawing Sheets

(51) Int. Cl.
  *B60W 10/06* (2006.01)
  *B60W 20/10* (2016.01)
  *B60W 20/40* (2016.01)
  *B60W 50/14* (2012.01)
  *G01C 21/36* (2006.01)
  *B60W 10/08* (2006.01)
  *B60W 20/12* (2016.01)
  *B60K 35/00* (2006.01)
  *B60L 58/12* (2019.01)

(52) U.S. Cl.
  CPC ... *B60W 2540/10* (2013.01); *B60W 2550/143* (2013.01); *B60W 2550/408* (2013.01); *B60W 2710/06* (2013.01); *Y02T 10/84* (2013.01); *Y10S 903/903* (2013.01)

(56) References Cited

U.S. PATENT DOCUMENTS

| | | | |
|---|---|---|---|
| 8,258,978 B2 | 9/2012 | Greasby | |
| 8,284,038 B2 | 10/2012 | Wu | |
| 8,542,108 B1 | 9/2013 | Izdepski | |
| 8,692,739 B2 | 4/2014 | Mathieu et al. | |
| 8,836,544 B1* | 9/2014 | Balogh | B63H 21/17 340/439 |
| 8,841,996 B2* | 9/2014 | Nakamichi | B60K 35/00 340/428 |
| 8,855,880 B2* | 10/2014 | Rowker | B60K 35/00 180/165 |
| 8,972,088 B2* | 3/2015 | Kozloski | B60W 10/02 701/1 |
| 9,527,502 B1* | 12/2016 | Park | B60W 20/10 |
| 9,981,555 B2* | 5/2018 | Kishida | B60K 35/00 |
| 2003/0158638 A1* | 8/2003 | Yakes | A62C 27/00 701/22 |
| 2010/0010707 A1* | 1/2010 | Izumi | G01R 31/362 701/33.7 |
| 2010/0057280 A1* | 3/2010 | Crowe | B60K 6/48 701/22 |
| 2011/0082620 A1* | 4/2011 | Small | B60K 35/00 701/31.4 |
| 2011/0175754 A1 | 7/2011 | Karpinsky | |
| 2011/0241859 A1* | 10/2011 | Handa | B60K 6/448 340/438 |
| 2012/0035795 A1* | 2/2012 | Yu | B60W 50/0097 701/22 |
| 2012/0179319 A1* | 7/2012 | Gilman | B60W 50/0097 701/22 |
| 2014/0180512 A1* | 6/2014 | Kozloski | B60W 10/02 701/22 |
| 2014/0180513 A1* | 6/2014 | Kozloski | B60W 10/02 701/22 |
| 2014/0303820 A1* | 10/2014 | Aoki | B60W 10/08 701/22 |
| 2014/0303839 A1* | 10/2014 | Filev | G06F 3/0481 701/36 |
| 2014/0371969 A1* | 12/2014 | Asai | B60L 7/16 701/22 |
| 2015/0025691 A1* | 1/2015 | Fadell | G05D 23/1902 700/276 |
| 2015/0142143 A1* | 5/2015 | Cobbett | G06F 1/163 700/91 |
| 2015/0142243 A1* | 5/2015 | Kozloski | B60W 10/02 701/22 |
| 2015/0227445 A1* | 8/2015 | Arscott | G06F 11/3062 713/340 |
| 2015/0279175 A1* | 10/2015 | Hyde | G06Q 10/087 340/815.4 |
| 2015/0350413 A1* | 12/2015 | Ma | H04M 1/72577 455/418 |
| 2016/0061613 A1* | 3/2016 | Jung | G01C 21/3632 701/49 |
| 2016/0063772 A1* | 3/2016 | Esler | G07C 5/004 701/123 |
| 2018/0032997 A1* | 2/2018 | Gordon | G06Q 20/3224 |

FOREIGN PATENT DOCUMENTS

| | | |
|---|---|---|
| EP | 2305505 A2 | 4/2011 |
| KR | 20140072267 A | 6/2014 |
| WO | 2014107513 A2 | 7/2014 |

OTHER PUBLICATIONS

Optimal Energy and Catalyst Temperature Management of Plug-in Hybrid Electric Vehicles for Minimum Fuel Consumption and Tail-Pipe Emissions; Dongsuk Kum; Huei Peng; Norman K. Bucknor; IEEE Transactions on Control Systems Technology Year: 2013, vol. 21, Issue: 1; pp. 14-26, DOI: 10.1109/TCST.2011.2171344.*

Optimal catalyst temperature management of Plug-in Hybrid Electric Vehicles; Dongsuk Kum; Huei Peng; Norman K. Bucknor ;Proceedings of the 2011 American Control Conference; Year: 2011; pp. 2732-2738, DOI: 10.1109/ACC.2011.5991499.*

HVS-Aware Dynamic Backlight Scaling in TFT-LCDs; A. Iranli ; W. Lee ; M. Pedram; IEEE Transactions on Very Large Scale Integration (VLSI) Systems; vol. 14 , Issue: 10; pp. 1103-1116; IEEE Journals & Magazines. (Year: 2006).*

US Patent and Trademark Office, Office Action from related U.S. Appl. No. 14/814,677, dated Jul. 1, 2016.

* cited by examiner

ELECTRIC VEHICLE DISPLAY SYSTEMS

TECHNICAL FIELD

Disclosed herein are vehicle display systems.

BACKGROUND

Vehicles often include many systems that allow a driver to interact with the vehicle and its systems. In particular, vehicles often provide a variety of devices and techniques to control and monitor the vehicle's various subsystems and functions. As the number of features and functions available to a driver increases, so does the complexity of the user interface used to control these features and functions. Thus, an enhanced and flexible system for presenting vehicle features to the user may be desired.

SUMMARY

An electric vehicle display system may include a battery, an interface configured to present at least one selectable icon configured to control a battery powered vehicle feature, and a controller programmed to, in response to state-of-charge (SOC) data indicating that a trip range exceeds a possible driving range, update the selectable icon to indicate a suggested adjustment to the vehicle feature to decrease power demand of the feature.

An electric vehicle display system may include a battery, an interface configured to present an icon configured to control a battery powered vehicle feature, and a controller programmed to receive state-of-charge (SOC) data from the battery, and in response to the SOC data indicating a current SOC being less than a minimum threshold, present an alert configured to enhance the icon to prompt adjustment of the feature to decrease power demand of the feature.

A method may include receiving state-of-charge (SOC) data indicating a driving range; and in response to the SOC data indicating a trip range is to exceed the driving range, presenting an enhanced selectable icon, via a vehicle display, configured to control a battery powered vehicle feature to encourage adjustment of the feature to decrease power demand of the feature.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompanying drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Vehicle interface systems may provide various options for accessing and interacting with vehicle systems. These systems may include electric vehicle ("EV") controls and other control options such as vehicle conditioning controls (e.g., air conditioning and heat controls), seat conditioning controls (e.g., heated or cooled seat features), etc. Customers may become overwhelmed by the options and information provided on the human-machine interface (HMI) within the vehicle. At certain times while the vehicle is in use, certain ones of these features may be more relevant to the current driving conditions than others based on certain vehicle data. Moreover, based on a certain state of charge ("SOC") of a vehicle battery, the vehicle display system may encourage driver interaction with certain features that affect the electric vehicle's battery power and encourage decreasing the demand for electric power.

Electric vehicles may be powered by a traction motor and a high voltage battery. A display system is described herein to use vehicle data to encourage driver behavior and interaction with certain vehicle features that affect the battery SOC. Under certain SOC conditions, the display may be updated to draw the driver's attention to certain vehicle features via an SOC alert. For example, if a low SOC is recognized, the display may enlarge an "EV-later" icon to encourage the driver to select the EV-later vehicle feature. In another example, if a low SOC is recognized, the icon associated with the electric seat warmers may be highlighted or enlarged to draw attention to the associated vehicle feature and encourage decreasing the heat setting.

Encouraging use of a vehicle features at an appropriate time may enhance driving experiences in addition to increasing fuel economy. In some situations, it is important for the vehicle to run in EV, or use the electric motor. In other situations, it may be important for the vehicle to use the gas engine and to conserve battery power. The displays and processes described herein may be implemented on various hybrid electric vehicles (HEV), plug-in hybrid electric vehicles (PHEV), electric vehicle (EV), or any other vehicle using a rechargeable power source, such as a battery.

Figure 1A:
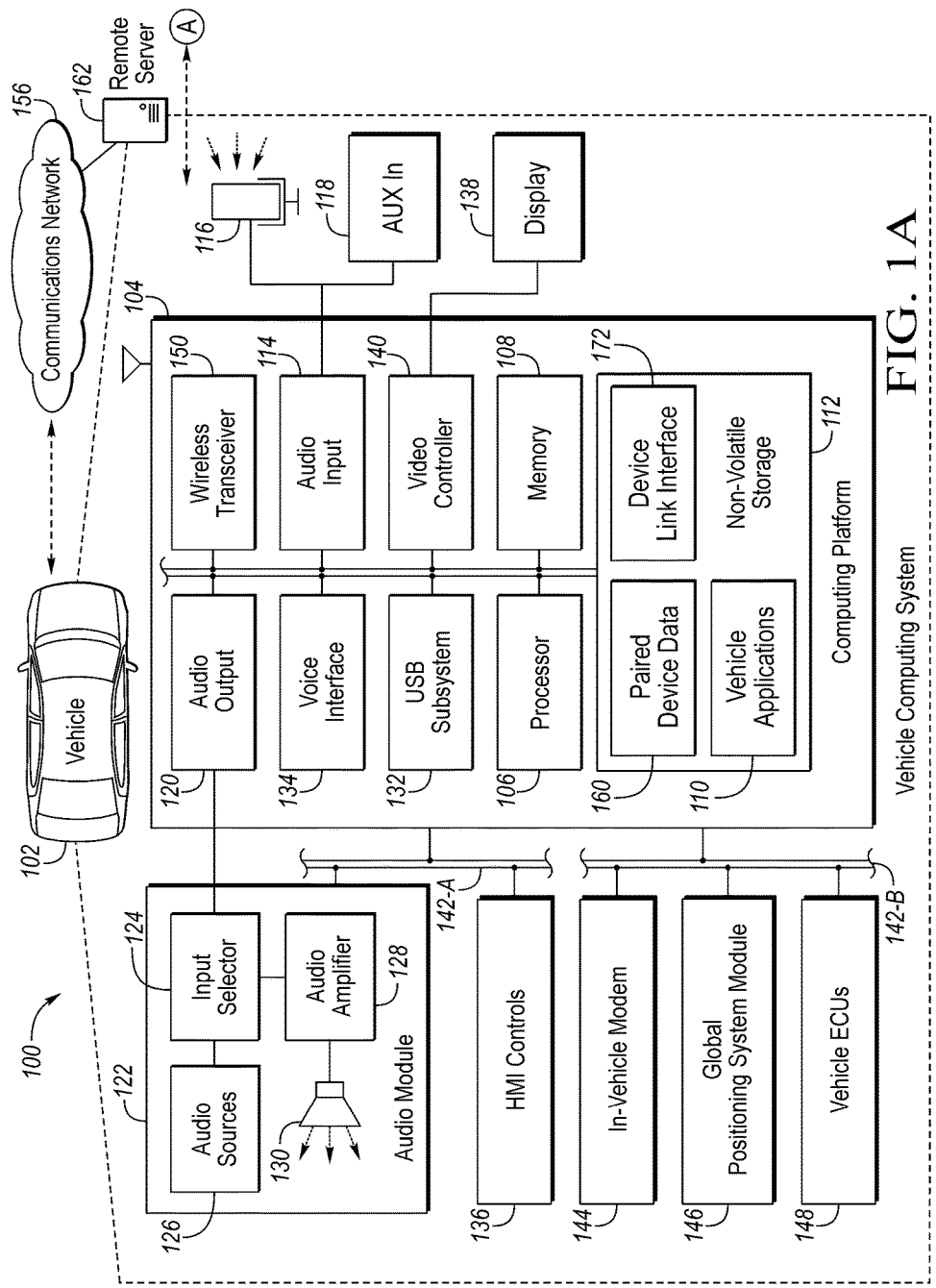
FIGS. 1A and 1B illustrate an example diagram of a system that may be used to provide telematics services to a vehicle.
Figure 1B:
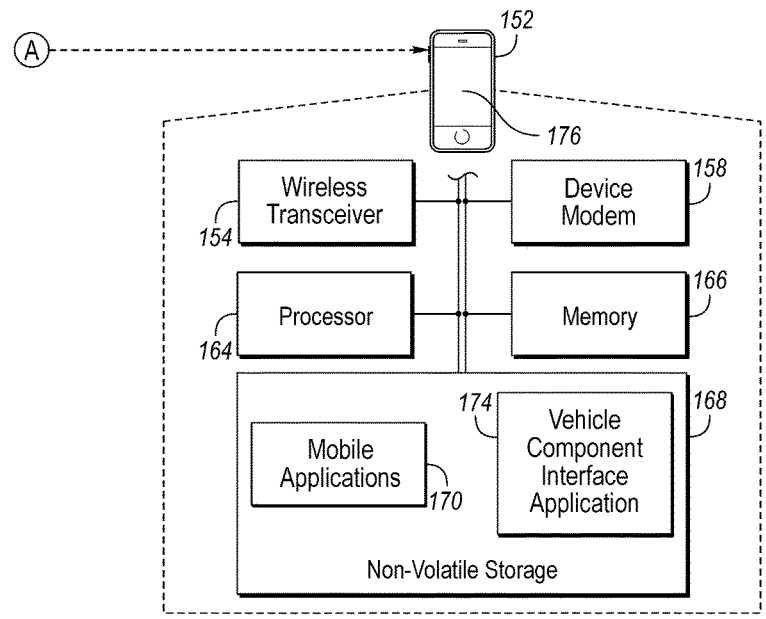

FIGS. 1A and 1B illustrate an example diagram of a system 100 that may be used to provide telematics services to a vehicle 102. The vehicle 102 may be one of various types of passenger vehicles, such as a crossover utility vehicle (CUV), a sport utility vehicle (SUV), a truck, a recreational vehicle (RV), a boat, a plane or other mobile machine for transporting people or goods. Telematics services may include, as some non-limiting possibilities, navigation, turn-by-turn directions, vehicle health reports, local business search, accident reporting, and hands-free calling. In an example, the system 100 may include the SYNC system manufactured by The Ford Motor Company of Dearborn, Mich. It should be noted that the illustrated system 100 is merely an example, and more, fewer, and/or differently located elements may be used.

The computing platform 104 may include one or more processors 106 and controllers configured to perform instructions, commands and other routines in support of the processes described herein. For instance, the computing platform 104 may be configured to execute instructions of vehicle applications 110 to provide features such as navigation, accident reporting, satellite radio decoding, hands-free calling and parking assistance. Such instructions and other data may be maintained in a non-volatile manner using a variety of types of computer-readable storage medium 112. The computer-readable medium 112 (also referred to as a processor-readable medium or storage) includes any non-transitory medium (e.g., a tangible medium) that participates in providing instructions or other data that may be read by the processor 106 of the computing platform 104. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

The computing platform 104 may be provided with various features allowing the vehicle occupants to interface with the computing platform 104. For example, the computing platform 104 may include an audio input 114 configured to receive spoken commands from vehicle occupants through a connected microphone 116, and auxiliary audio input 118 configured to receive audio signals from connected devices. The auxiliary audio input 118 may be a physical connection, such as an electrical wire or a fiber optic cable, or a wireless input, such as a BLUETOOTH audio connection. In some examples, the audio input 114 may be configured to provide audio processing capabilities, such as pre-amplification of low-level signals, and conversion of analog inputs into digital data for processing by the processor 106.

The computing platform 104 may also provide one or more audio outputs 120 to an input of an audio module 122 having audio playback functionality. In other examples, the computing platform 104 may provide the audio output to an occupant through use of one or more dedicated speakers (not illustrated). The audio module 122 may include an input selector 124 configured to provide audio content from a selected audio source 126 to an audio amplifier 128 for playback through vehicle speakers 130 or headphones (not illustrated). The audio sources 126 may include, as some examples, decoded amplitude modulated (AM) or frequency modulated (FM) radio signals, and audio signals from compact disc (CD) or digital versatile disk (DVD) audio playback. The audio sources 126 may also include audio received from the computing platform 104, such as audio content generated by the computing platform 104, audio content decoded from flash memory drives connected to a universal serial bus (USB) subsystem 132 of the computing platform 104, and audio content passed through the computing platform 104 from the auxiliary audio input 118.

The computing platform 104 may utilize a voice interface 134 to provide a hands-free interface to the computing platform 104. The voice interface 134 may support speech recognition from audio received via the microphone 116 according to grammar associated with available commands, and voice prompt generation for output via the audio module 122. In some cases, the system may be configured to temporarily mute or otherwise override the audio source specified by the input selector 124 when an audio prompt is ready for presentation by the computing platform 104 and another audio source 126 is selected for playback.

The computing platform 104 may also receive input from human-machine interface (HMI) controls 136 configured to provide for occupant interaction with the vehicle 102. For instance, the computing platform 104 may interface with one or more buttons or other HMI controls configured to invoke functions on the computing platform 104 (e.g., steering wheel audio buttons, a push-to-talk button, instrument panel controls, etc.). The computing platform 104 may also drive or otherwise communicate with one or more displays 138 configured to provide visual output to vehicle occupants by way of a video controller 140. In some cases, the display 138 may be a touch screen further configured to receive user touch input via the video controller 140, while in other cases the display 138 may be a display only, without touch input capabilities.

The computing platform 104 may be further configured to communicate with other components of the vehicle 102 via one or more in-vehicle networks 142. The in-vehicle networks 142 may include one or more of a vehicle controller area network (CAN), an Ethernet network, and a media oriented system transfer (MOST), as some examples. The in-vehicle networks 142 may allow the computing platform 104 to communicate with other vehicle 102 systems, such as a vehicle modem 144 (which may not be present in some configurations), a global positioning system (GPS) module 146 configured to provide current vehicle 102 location and heading information, and various vehicle ECUs 148 configured to cooperate with the computing platform 104. As some non-limiting possibilities, the vehicle ECUs 148 may include a powertrain control module configured to provide control of engine operating components (e.g., idle control components, fuel delivery components, emissions control components, etc.) and monitoring of engine operating components (e.g., status of engine diagnostic codes); a body control module configured to manage various power control functions such as exterior lighting, interior lighting, keyless entry, remote start, and point of access status verification (e.g., closure status of the hood, doors and/or trunk of the vehicle 102); a radio transceiver module configured to communicate with key fobs or other local vehicle 102 devices; a battery electric control module (BECM) or Electrified Vehicle Control Module (EVCM) configured to manage various battery powered functions, and a climate control management module configured to provide control and monitoring of heating and cooling system components (e.g., compressor clutch and blower fan control, temperature sensor information, etc.), etc.

As shown, the audio module 122 and the HMI controls 136 may communicate with the computing platform 104 over a first in-vehicle network 142-A, and the vehicle modem 144, GPS module 146, and vehicle ECUs 148 may communicate with the computing platform 104 over a second in-vehicle network 142-B. In other examples, the computing platform 104 may be connected to more or fewer in-vehicle networks 142. Additionally or alternately, one or more HMI controls 136 or other components may be connected to the computing platform 104 via different in-vehicle networks 142 than shown, or directly without connection to an in-vehicle network 142.

The computing platform 104 may also be configured to communicate with mobile devices 152 of the vehicle occupants. The mobile devices 152 may be any of various types of portable computing device, such as cellular phones, tablet computers, smart watches, laptop computers, portable music players, or other devices capable of communication with the computing platform 104. In many examples, the computing platform 104 may include a wireless transceiver 150 (e.g., a BLUETOOTH module, a ZIGBEE transceiver, a Wi-Fi transceiver, an IrDA transceiver, an RFID transceiver, etc.) configured to communicate with a compatible wireless transceiver 154 of the mobile device 152. Additionally or alternatively, the computing platform 104 may communicate with the mobile device 152 over a wired connection, such as via a USB connection between the mobile device 152 and the USB subsystem 132.

The communications network 156 may provide communications services, such as packet-switched network services (e.g., Internet access, VoIP communication services), to devices connected to the communications network 156. An example of a communications network 156 may include a cellular telephone network. Mobile devices 152 may provide network connectivity to the communications network 156 via a device modem 158 of the mobile device 152. To facilitate the communications over the communications network 156, mobile devices 152 may be associated with unique device identifiers (e.g., mobile device numbers (MDNs), Internet protocol (IP) addresses, etc.) to identify the communications of the mobile devices 152 over the communications network 156. In some cases, occupants of the vehicle 102 or devices having permission to connect to the computing platform 104 may be identified by the computing platform 104 according to paired device data 160 maintained in the storage medium 112. The paired device data 160 may indicate, for example, the unique device identifiers of mobile devices 152 previously paired with the computing platform 104 of the vehicle 102, such that the computing platform 104 may automatically reconnected to the mobile devices 152 referenced in the paired device data 160 without user intervention.

When a mobile device 152 that supports network connectivity is paired with the computing platform 104, the mobile device 152 may allow the computing platform 104 to use the network connectivity of the device modem 158 to communicate over the communications network 156 with the remote telematics services 162. In one example, the computing platform 104 may utilize a data-over-voice plan or data plan of the mobile device 152 to communicate information between the computing platform 104 and the communications network 156. Additionally or alternatively, the computing platform 104 may utilize the vehicle modem 144 to communicate information between the computing platform 104 and the communications network 156, without use of the communications facilities of the mobile device 152.

Similar to the computing platform 104, the mobile device 152 may include one or more processors 164 configured to execute instructions of mobile applications 170 loaded to a memory 166 of the mobile device 152 from storage medium 168 of the mobile device 152. In some examples, the mobile applications 170 may be configured to communicate with the computing platform 104 via the wireless transceiver 154 and with the remote telematics services 162 or other network services via the device modem 158. The computing platform 104 may also include a device link interface 172 to facilitate the integration of functionality of the mobile applications 170 into the grammar of commands available via the voice interface 134 as well as into display 138 of the computing platform 104. The device link interfaced 172 may also provide the mobile applications 170 with access to vehicle information available to the computing platform 104 via the in-vehicle networks 142. Some examples of device link interfaces 172 include the SYNC APPLINK component of the SYNC system provided by The Ford Motor Company of Dearborn, Mich., the CarPlay protocol provided by Apple Inc. of Cupertino, Calif., or the Android Auto protocol provided by Google, Inc. of Mountain View, Calif. The vehicle component interface application 174 may be once such application installed to the mobile device 152.

The vehicle component interface application 174 of the mobile device 152 may be configured to facilitate access to one or more vehicle 102 features made available for device configuration by the vehicle 102. In some cases, the available vehicle 102 features may be accessible by a single vehicle component interface application 174, in which case such the vehicle component interface application 174 may be configured to be customizable or to maintain configurations supportive of the specific vehicle 102 brand/model and option packages. In an example, the vehicle component interface application 174 may be configured to receive, from the vehicle 102, a definition of the features that are available to be controlled, display a user interface descriptive of the available features, and provide user input from the user interface to the vehicle 102 to allow the user to control the indicated features. As exampled in detail below, an appropriate mobile device 152 to display the vehicle component interface application 174 may be identified (e.g. mobile display 176), and a definition of the user interface to display may be provided to the identified vehicle component interface application 174 for display to the user.

Systems such as the system 100 may require mobile device 152 pairing with the computing platform 104 and/or other setup operations. However, as explained in detail below, a system may be configured to allow vehicle occupants to seamlessly interact with user interface elements in their vehicle or with any other framework-enabled vehicle, without requiring the mobile device 152 or wearable device to have been paired with or be in communication with the computing platform 104.

Additionally, the wireless transceiver 150 may receive and transmit data regarding the vehicle's position to other vehicles in vehicle-to-vehicle communication. The processor 106 may process such incoming vehicle position data. As explained herein, the vehicle position data received from surrounding vehicles may be used to determine whether the vehicle 102 is following too close to a followed vehicle and provide an alert accordingly. That is, if the vehicle 102 is following too closely behind the followed vehicle, an alert may be presented via the display 138.

The remote server 162 and communications network 156 may also facilitate transmission of other vehicle-to-vehicle data such as data acquired from other mobile applications and websites such as Google Maps™, Waze™, etc. In these examples, data may be shared between users and used to determine the location of other vehicles, emergency situations, etc.

Figure 2:
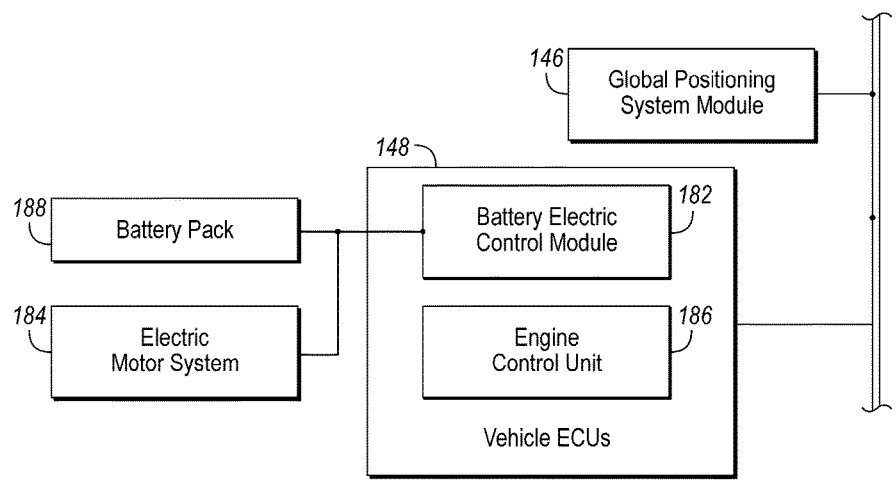
FIG. 2 illustrates an example block diagram of a portion of the vehicle display system.

FIG. 2 illustrates an example diagram of a portion of the display system 100, including a battery pack system 188 (also referred to herein as battery 188). The battery 188 may store energy that can be used by electric motors (not shown) within an electric motor system 184. The battery 188 typically provides a high voltage DC output and may be recharged by an external power source. The methods described herein are equally applicable to a pure electric vehicle or any other device using a battery pack.

In addition to providing energy for propulsion, the battery 188 may provide energy for other vehicle electrical systems. A typical system may include a DC/DC converter module (not shown) that converts the high voltage DC output of the battery 188 to a low voltage DC supply that is compatible with other vehicle loads, such as vehicle cabin heating and cooling, vehicle seat heating and cooling, entertainment systems, etc.

The battery 188 may be controlled by the Electrified Vehicle Control Module (EVCM) 182, which may be a separate module that may communicate with an Engine Control Unit (ECU) 186, or contained within the vehicle ECU 148. The EVCM 182, as explained above with respect to FIG. 1, may be configured to manage various electric vehicle systems and battery usage. The EVCM 182 may also be configured to determine a battery state of charge (SOC).

Figure 3:
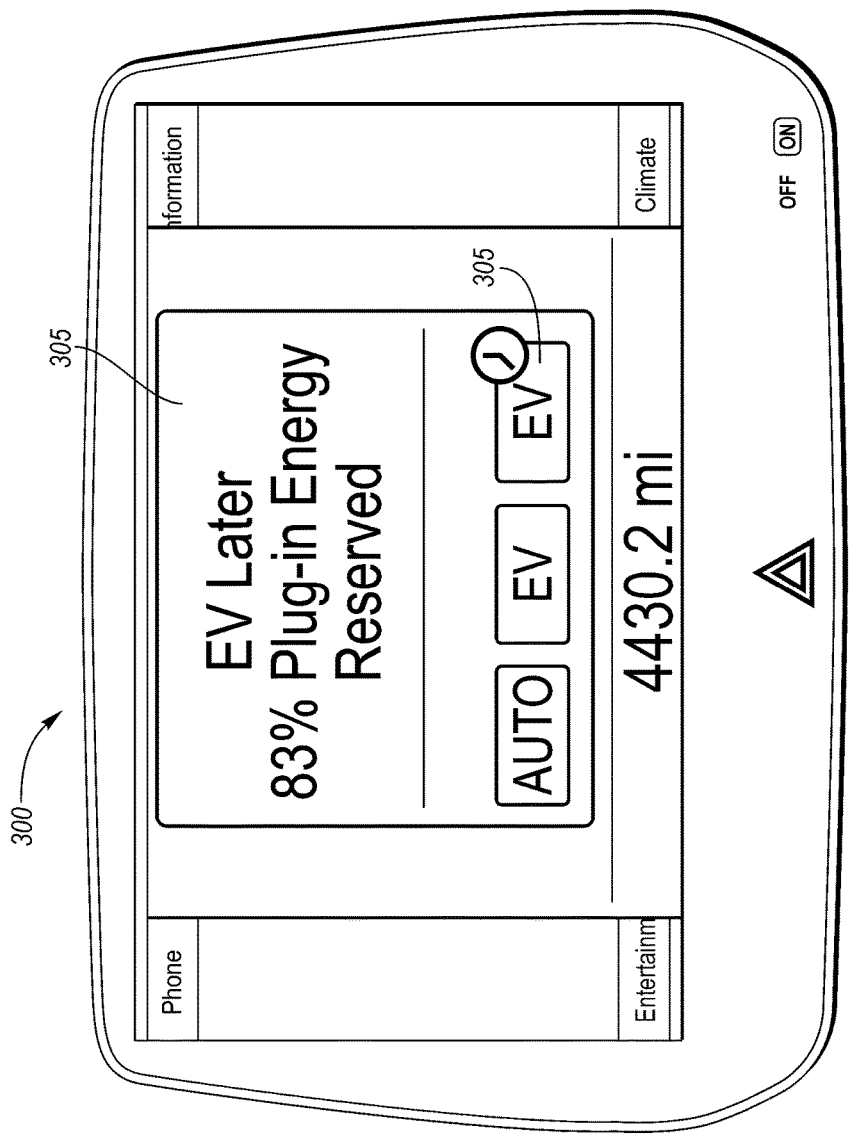
FIGS. 3 through 6 illustrate example vehicle displays.

FIG. 3 illustrates an example display 138 showing an interface 300 having an EV opt-out alert 305, or EV Later alert 305. EV Later alert 305 may include an EV later icon 310, which upon selection, may enable an EV later mode, and is configured to conserve battery power by opting to use the gas engine instead of the electric motor. This situation may be desirable upon entering a highway which may put more demands on the battery and may result in sub-optimal efficiency. The driver may elect to use the gas engine and save the battery power for when driving at lower speeds.

Figure 4:
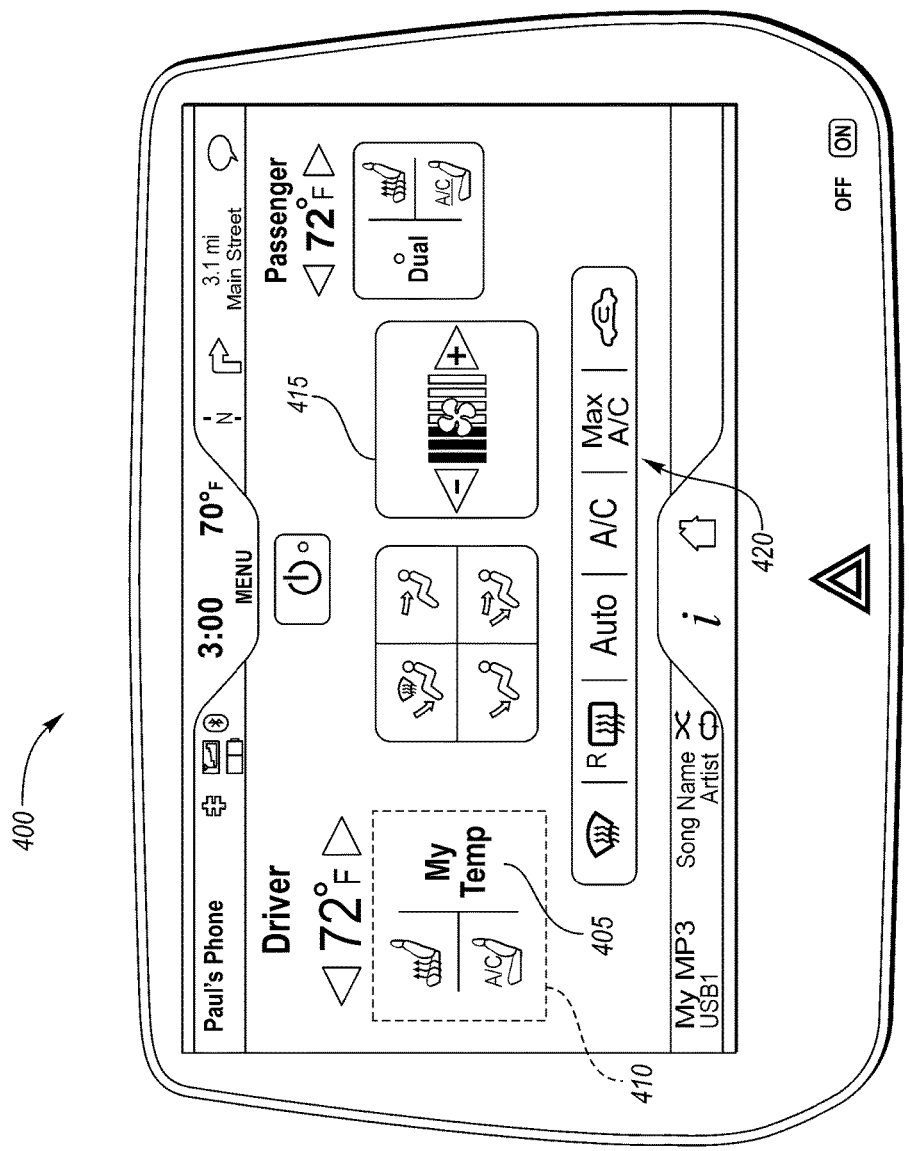

FIG. 4 illustrates an example display 138 showing an interface 400 having a selectable seat conditioning icon 405. The interface 400 may also include an alert 410 such as an animated surround configured to draw attention to the seat conditioning feature. The interface 400 may also include fan speed controls 415, and other cabin conditioning controls 420. Each of these controls may also include an alert similar to the alert 410.

Figure 5:
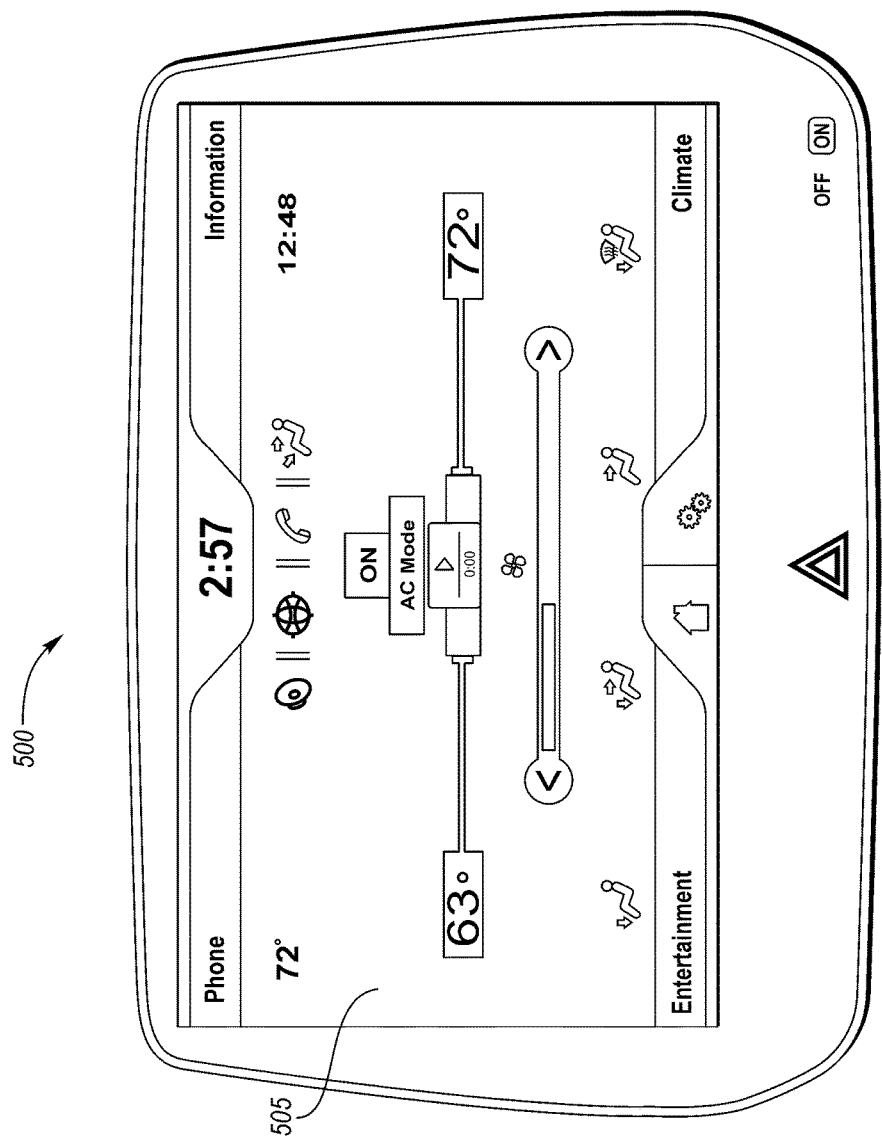

FIG. 5 illustrates an example display 138 showing an interface 500 having a cabin conditioning control panel 505. The cabin conditioning control panel 505 may include temperature and fan controls for adjusting the vehicle cabin temperature. The cabin conditioning control panel 505 may be displayed in response to a low SOC in an effort to alert the driver to the low SOC level, as well as encourage the driver to adjust the cabin temperature and reduce the energy draw on the battery.

Figure 6:
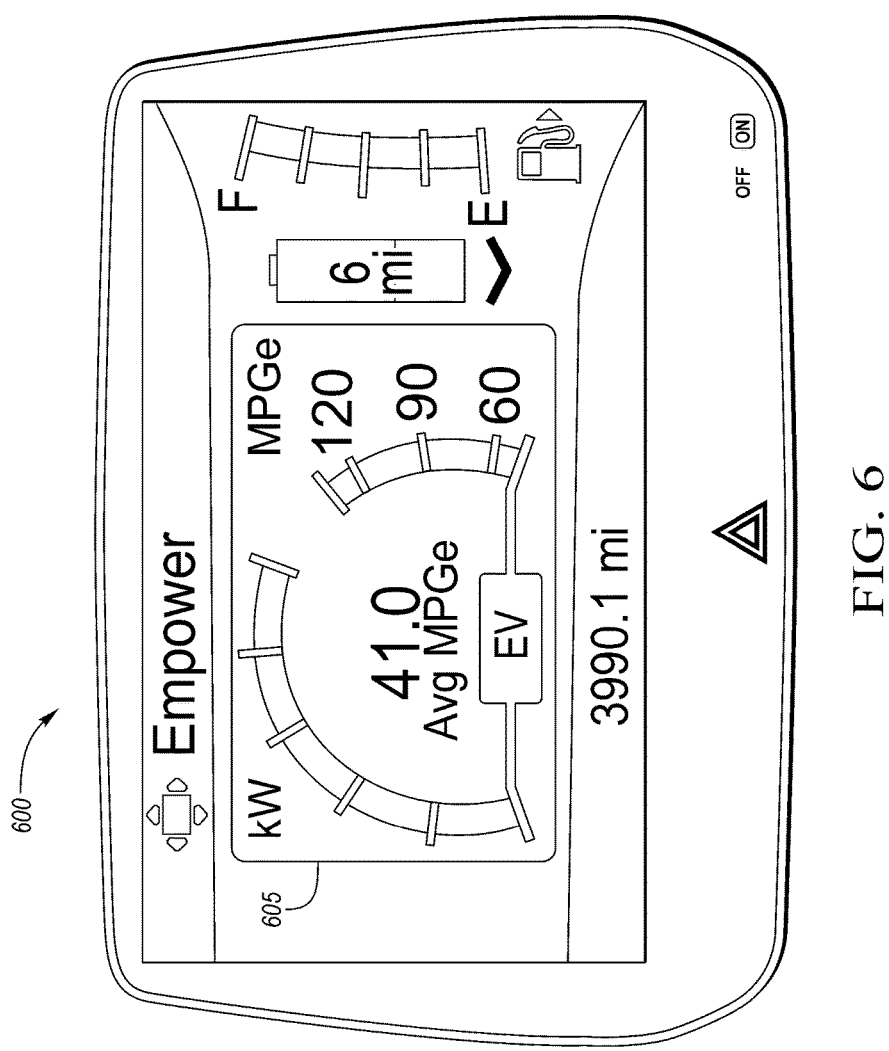

FIG. 6 illustrates an example display 138 showing an interface 600 having a power panel 605. For exemplary purposes only, the power panel may include a screen similar to the Ford Motor Company™ Empower screen which may display certain EV characteristics and help guide the driver in how to avoid large pedal demands that may cause the engine to start during vehicle operation. For example, the panel 605 may show an interactive graphic display that shows a driver's pedal position as well as a pedal threshold indicative of a pedal position as which the gas engine would be started in order for the vehicle propulsion demands to be met. By illustrating this threshold, the interface enables the driver to stay in EV without starting the engine. The power panel 605 may be displayed in response to a low SOC level.

FIGS. 3-6 are shown as examples only and other implementations may be included. In one example, the alert 410 may surround the fan speed controls 415. In another example, the seat conditioning icon 405 may be presented as an overlay, similar to the cabin conditioning control panel 505 as shown in FIG. 5. Thus, the interfaces may be updated, or modified, to call attention to a specific battery powered vehicle feature that is currently creating a large draw on the battery power. By updating an interface based on the electric power demands of certain vehicle features, the interface may encourage adjustments to decrease the battery draw.

Furthermore, while the interfaces are described as being presented via display 138, the interfaces may also be presented via a heads-up display (HUD), and/or mobile display 176.

Figure 7:
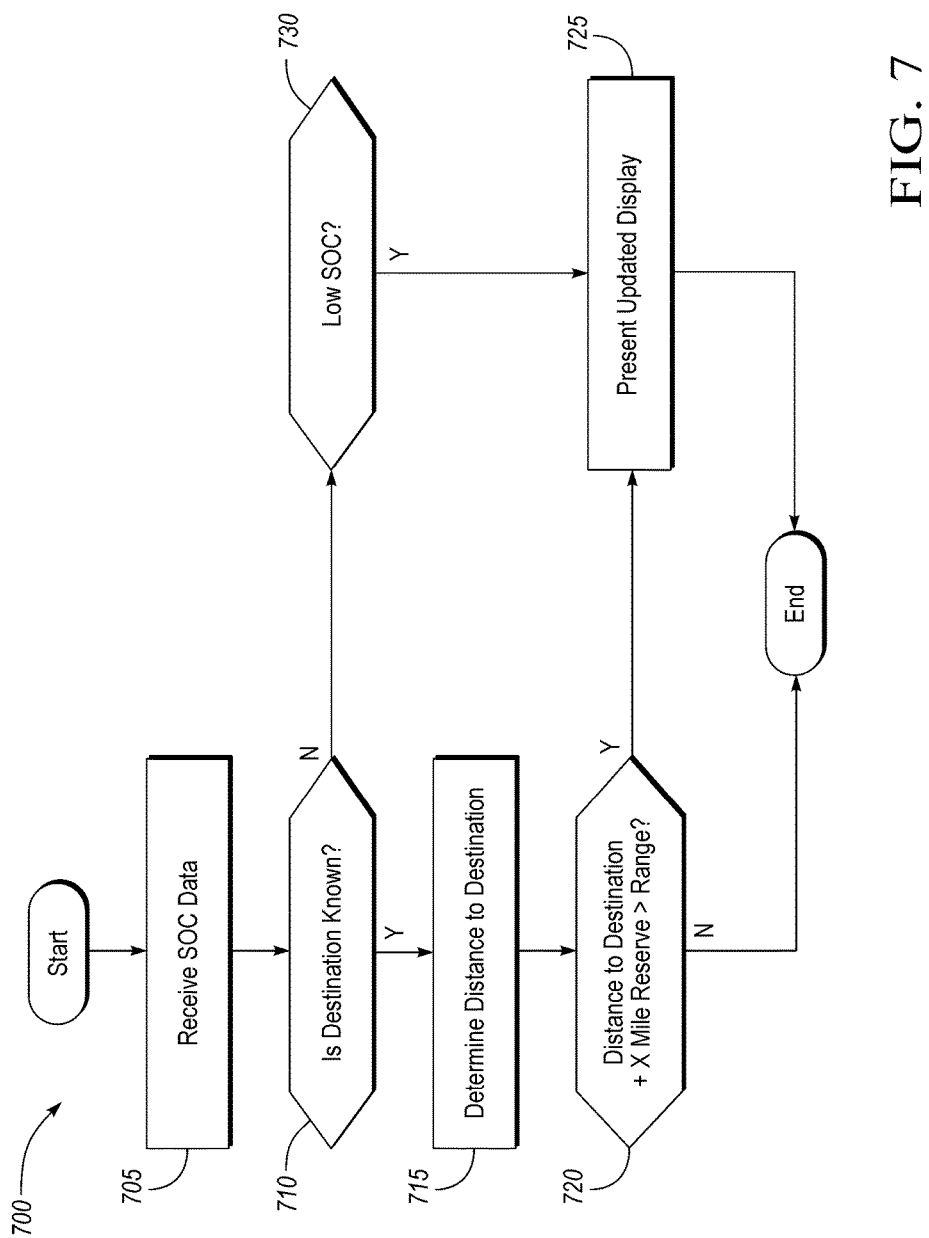
FIG. 7 illustrates an example process for a vehicle display system.

FIG. 7 illustrates an example process 700 for the vehicle display system 100. The process 700 beings at block 705 where the computing platform 104 receives SOC data from the EVCM 182. The SOC data may include the current battery SOC as well as data configured to calculate a driving range. The range may include the distance, in miles, that the vehicle 102 may be powered by electric power.

At block 710, the computing platform 104 may determine whether a destination is known. That is, does the GPS module 146 include a destination, either via driver entry, or via prediction methods. If the computing platform 104 is aware of a destination, the process 700 proceeds to block 715. If not, the process 700 proceeds to block 730.

At block 715, the computing platform 104 may determine a distance to the destination, or a trip range. That is, how many miles are between the current vehicle location and the destination. Additionally or alternatively, the trip range may include how much electric power is needed to complete the trip.

At block 720, the computing platform 104 may compare the distance to the destination with the current range and determine if the trip range, the distance-to-destination plus X miles reserve, exceeds the battery driving range. If the trip range exceeds the driving range, the process 700 proceeds to block 725. If not, the process ends.

At block 725, the computing platform 104 may instruct the display 138 to present an updated display including the SOC alert. The SOC alert, as explained, may be an alert to aid the driver in reducing energy consumption of the vehicle by encouraging an adjustment of certain vehicle features. As shown in FIGS. 3-6, the alerts may take many forms, including an animation, increasing the size of an icon, overlaying a panel over the current interface, etc. Some alerts may draw attention to various selectable icons, selection of which may facilitate control of the associated vehicle feature, and some alerts may overlay on the existing interface.

At block 730, the computing platform 104 may determine whether the SOC indicates a current SOC that falls below a minimum threshold. For example, the minimum SOC may be 10%. The computing platform 104 may also determine whether a driving range falls below a minimum range threshold, such as 20 miles. If the SOC is below the minimum threshold, the process 700 proceeds to block 725. If not, the process ends.

The process 700 may then end. While the above process is described as being performed by the computing platform 104, the processes may also be carried out by other components, controllers, and processors, for example, components within the mobile device 152, remote server 162, etc.

Accordingly, a display system as described herein may use SOC data to update a vehicle display to include a SOC alert. The SOC alert may include increasing the size of an icon associated with a vehicle feature, animating an icon, overlaying a control panel on the current interface, etc.

Computing devices, such as the mixer, remote device, external server, etc., generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included with in a computing device employing a computer operating system such as one of those mentioned above, and are accessed via a network and any one or more of a variety of manners. A file system may be accessible for a computer operating system, and make the files stored in various formats. An RDBMS generally employs the Structure Query Language (SQL) in addition to language for creating, storing, editing, and executing stored procedures, such as PL/SQL language mentioned above.

In some examples, system elements may be implemented as computer-readable instructions (e.g., software) on one or more computing devices (e.g., servers, personal computers, etc.) stored on computer readable media associated therewith (e.g., disks, memories, etc.). A computer program product may comprise such instructions stored in computer readable media for carrying out the functions described herein.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An electric vehicle display system comprising:
   a battery;
   an interface configured to present at least one selectable icon configured to control a battery powered vehicle feature; and
   a controller programmed to, in response to state-of-charge (SOC) data indicating that a trip range exceeds a possible driving range, present an alert including a control panel configured to present selectable options that control the vehicle feature to decrease power demand of the feature update the selectable icon to indicate a suggested adjustment.

2. The display system of claim 1, wherein the selectable icon is updated to include an animation surrounding the selectable icon.

3. A method for updating a vehicle display system comprising:
   receiving state-of-charge (SOC) data indicating a driving range; and
   in response to the SOC data indicating a current SOC being less than a minimum threshold, presenting an alert configured to enhance the icon to prompt adjustment of a battery-powered vehicle feature decrease power demand of the feature, wherein the alert includes a control panel configured to present selectable options that control the vehicle feature.

4. The display system of claim 1, wherein the selectable icon is updated to include an interactive graphic display configured to indicate a current pedal position with respect to a pedal threshold indicating the position of the pedal at which a gas engine will start.

5. The display system of claim 1, wherein the selectable icon is updated to include an electric power alert configured to present a selectable option to reserve electric energy for later.

6. The display system of claim 1, wherein the selectable icon is configured to selectably control the vehicle feature affecting the battery SOC.

7. An electric vehicle display system comprising:
   a battery;
   an interface configured to present an icon configured to control a battery powered vehicle feature; and
   a controller programmed to
      receive state-of-charge (SOC) data from the battery, and
      in response to the SOC data indicating a current SOC being less than a minimum threshold, present an alert configured to enhance the icon to prompt adjustment of the feature to decrease power demand of the feature, wherein the alert includes a control panel configured to present selectable options that control the vehicle feature.

8. The display system of claim 7, wherein the alert includes an animation surrounding the icon.

9. The method of claim 3, wherein the enhanced selectable icon includes an electric power alert presenting a selectable option to reserve electric energy for later.

10. The display system of claim 7, wherein the alert includes an interactive graphic display indicating a current pedal position with respect to a pedal threshold indicating the position of the pedal at which a gas engine will start.

11. The display system of claim 7, wherein the alert includes an electric power alert presenting a selectable option to reserve electric energy for later.

12. The method of claim 3, wherein the enhanced selectable icon includes an interactive graphic display indicating a current pedal position with respect to a pedal threshold indicating the position of the pedal at which a gas engine will start.

13. The method of claim 3, wherein the enhanced selectable icon includes an animation.

* * * * *